United States Patent [19]

Baba et al.

[11] Patent Number: 4,645,299

[45] Date of Patent: Feb. 24, 1987

[54] ROTARY INDICATING DEVICE

[75] Inventors: Takeshi Baba, Kasugai; Hiroki Iwasa, Aichi; Chikao Nagasaka, Nagoya; Kyozo Ohmi, Anjyo, all of Japan

[73] Assignee: Kabushiki Kaisha Tokai Rika Denki Seisakusho, Aichi, Japan

[21] Appl. No.: 586,087

[22] Filed: Mar. 5, 1984

[30] Foreign Application Priority Data

Mar. 8, 1983 [JP] Japan .................................. 58-38848

[51] Int. Cl.$^4$ .............................................. G02B 5/12
[52] U.S. Cl. ....................................... 350/99; 116/46
[58] Field of Search ................. 350/97, 107, 109, 613, 350/614, 99; 40/587, 613; 116/46; 301/37 SA

[56] References Cited

U.S. PATENT DOCUMENTS 3,758,190 10/1973 Douglas ................................ 350/97

4,194,809 3/1980 Campagna ............................ 350/97

Primary Examiner—John K. Corbin
Assistant Examiner—Loha Ben
Attorney, Agent, or Firm—Jackson & Jones

[57] ABSTRACT

The disclosure relates to a rotary indicating device preferably in use, for example, for wheel covers for motor vehicles. The device includes a base member having an indication region and adapted to be rotated about a rotary axis. The indication region indicates a desired image and comprises a plurality of reflection faces. The reflection faces are inclined in the same direction and also at the same angle with respect to a standard plane perpendicular to a rotary axis of the base member. Thus, when the base member rotates, the observer can visually recognize the image as a clear single image due to the after image phenomenon.

4 Claims, 29 Drawing Figures

ROTARY INDICATING DEVICE

BACKGROUND OF THE INVENTION

The present invention relates generally to a rotary indicating device in use, for example, for wheel covers of a motor vehicle, indication boards of advertising apparatus, ornamental elements for toys, and the like. More particularly the invention relates to a rotary indicating device which comprises a base member having an indication surface, the indication surface including an indicating region formed thereon and representing a desired image such as pictures, letters, marks and the like. The indication region is seen by an observer as a static visual image or moving image due to the after image phenomenon during the rotation of the base member.

Generally, the image formed on a rotary device is not able to be visually recognized by an observer as a clear image during the rotation of the rotary device. It will be readily seen that if such an image provided for the rotary device could be visually recognized by the observer as a clear image, it will produce an improved ornamental efficiency.

From the above viewpoint, there has been conventionally provided a rotary indicating device, namely a wheel cover in use for motor vehicles, in Japanese Utility Model Laid-open Publication No. 133923/1974. The above wheel cover comprises a cover body, and an ornamental disc relatively rotatably mounted on the front surface of the body. The ornamental disc has a shaft concentrically extending from the rear surface thereof. The shaft passes through and is relatively rotatably supported by a journal mounted on the central portion of the body, and has, at its rear portion positioned beside the rear surface of the body, a weight for preventing the ornamental disc from rotating together with the body. Therefore, the image formed on the ornamental disc may be maintained in a static manner with respect to the cover body rotating together with the wheel of the vehicle, so that the image can be visually recognized by the observer who sees the advancing vehicle.

The known wheel cover as described above, however, has such disadvantages that it is complex in construction and can not produce a moving image.

SUMMARY OF THE INVENTION

It is therefore an essential object of the present invention to provide a rotary indicating device which is simple in construction, in which the desired image is integrally formed on an indicating surface of a base member adapted to be rotated about a rotary axis, and the image can be visually recognized as a static or moving image by the observer due to the after image phenomenon during the rotation of the base member.

It is another object of the present invention to provide a rotary indicating device, in which the observer located at a fixed position with respect to the rotary indicating device can receive the reflected light representing substantially the same images from the indication surface of the base member more than two times per a single rotation of the base member, that is, the observer can visually recognize a clear image even if the base member is rotating at a relatively low rotational speed.

It is a further object of the present invention to provide a rotary indicating device, in which the observer can recognize the image formed on the base member as a moving image when the base member is rotating at a fixed position.

It is a still further object to provide a rotary indicating device, in which the observer can recognize the image formed on a base member as a moving image when the base member is relatively advancing with respect to the observer in a linear direction with rotation.

In accomplishing these and other objects, according to a first embodiment of the present invention, there is provided a rotary indicating device which comprises a base member having an indication surface and adapted to be rotated about a rotary axis, the indication surface including an indication region formed thereon and representing a desired image. The indication region comprises a plurality of image elements consisting of reflection faces. The reflection faces are inclined in the same direction and also at the same angle with respect to a standard plane perpendicular to a rotary axis of the base member.

With the first embodiment as described above, when the base member is rotated at a rotational speed over the predetermined value, the observer located at an appropriate fixed position with respect to the device can continuously receive the reflection lights from the reflection faces of the base member once per a rotation to visually recognize the desired image as a static image due to the after image phenomenon.

According to the above embodiment, since the reflection faces for collectively representing the desired image can be integrally formed on the indication surface of the base member per se. A special additional member, such as the ornamental disc provided with a wheel cover as previously described with respect to the prior art, is not necessary, and rotary indicating devices simple in construction can be provided.

According to a second embodiment of the present invention, there is provided a rotary indicating device which comprises a base member adapted to be rotated about a rotary axis and, having an indication surface, the indication surface including an indication region formed thereon and representing a desired image. The indication region comprising a plurality of same image element units, each of which includes a predetermined number of image elements, each consisting of a corresponding reflection face. The reflection faces of each image element unit are inclined in various directions at the same angle with respect to a standard plane perpendicular to a rotary axis of the base member so that when the base member rotates and the incident light comes at an angle with respect to the rotary axis, the reflection faces of each image element unit alternately reflect the light into a fixed direction at a fixed rotary position of the base member.

With the second embodiment as described above, the observer can visually recognize the desired image such times per a single rotation of the base member as correspond to the number of reflection faces consisting each image element unit, so that the visual image recognized by the observer becomes clearer.

According to a third embodiment of the present invention, there is provided a rotary indicating device which comprises a base member adapted to be rotated about a rotary axis and, having an indication surface, the indication surface including an indication region formed thereon and representing a desired image. The indication region comprises a plurality of image element units which respectively includes a desired number of image elements, each consisting of a corresponding reflection face. The reflection faces of each image element unit are inclined in various directions but at the same angle with respect to a standard plane perpendicular to a rotary axis of the base member so that when the base member is rotated and the incident light comes at an angle with respect to the rotary axis, the reflection faces of each image element unit alternately reflect the light into a fixed direction at a fixed rotary position of the base member adapted to be rotated about a rotary axis and thus, when the rotary indicating device rotates at a rotational speed over a predetermined value, the visual image reflected from the indication surface toward the observer appears to be moving depending on the variation of the number of reflection faces reflecting light toward the observer at a fixed rotary position of the base member.

According to the fourth embodiment of the present invention, there is provided a rotary indicating device which comprises a rotary base member having an indication surface, the indication surface including an indication region formed thereon and representing a desired image. The indication region comprises a plurality of image element units which respectively include a desired number of image elements, each consisting of a corresponding reflection face. The reflection faces of each image element unit are inclined at such angles with respect to a standard plane perpendicular to a rotary axis of the base member that when the base member relatively advances with respect to an observer in a linear direction along a plane including the standard plane with rotation at a rotational speed over a predetermined value, the reflection faces of each image element unit for reflecting light toward the observer may change in turn. Thus, when the rotary indicating device advances with rotation at a rotational speed over a predetermined value, the visual image reflected from the indication surface toward the observer appears to be moving, depending on the advancement of said base member.

BRIEF DESCRIPTION OF THE DRAWINGS

These and other objects and features of the present invention will become apparent from the following description taken in conjunction with the preferred embodiments thereof, with reference to the accompanying drawings, in which:

FIG. 1b is an enlarged front elevational view illustrating a part of a reflection region of the rotary indicating device shown in FIG. 1a;

FIG. 3b is a perspective view illustrating a modification of a second embodiment shown in FIG. 3a;

DETAILED DESCRIPTION OF THE INVENTION

Figure 1A:
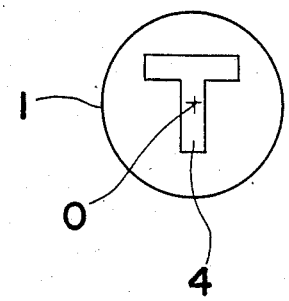
FIG. 1a is a front elevational view of a rotary indicating device according to a first embodiment of the present invention.

Before the description of the present invention proceeds, it is to be noted that like parts are designated by like reference numerals and symbols throughout several views of the accompanying drawings.

Figure 1B:
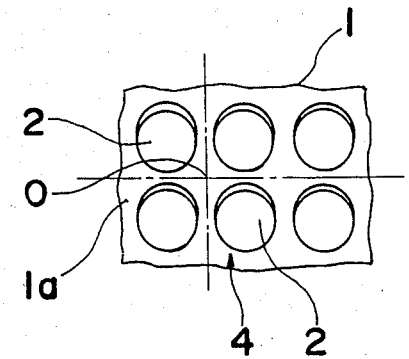
Figure 1C:
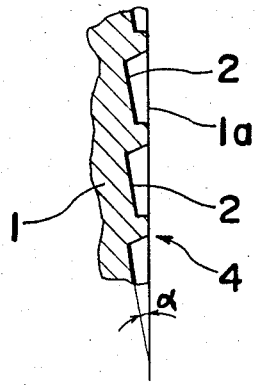
FIG. 1c is a longitudinally sectioned view of a rotary indicating device shown in FIG. 1b.

Referring first to FIGS. 1a, 1b, and 1c, there is provided a rotary indicating device according to a first embodiment of the present invention which may be preferably employed, for example, for wheel covers of motor vehicles, indication boards of advertising apparatus, ornamental elements for toys, and the like. The rotary indicating device has a base member 1 which is generally in the form of a circular plate and is preferably made with synthetic resin having a dark color with poor light reflection. The base member 1 is provided with a front surface, namely indication surface 1a in this embodiment, including an indication region 4 formed thereon and representing a desired image, i.e., by way of example, an alphabet letter "T", in the illustrated embodiment. As shown in FIGS. 1b and 1c, the indication region 4 in the form of "T" comprises a plurality of image elements or flat reflection faces 2 which are arranged regularly to collectively form "T", and are composed of bottom faces of recesses formed on the indication region 4 and covered by a reflection layer such as a metal plating layer or a deposited metal layer.

The reflection faces 2 are so designed as to be inclined in the same direction and at the same appropriate angle α with respect to a standard plane, i.e., the front surface 1a, perpendicular to a rotary axis O of the base member 1.

Figure 2:
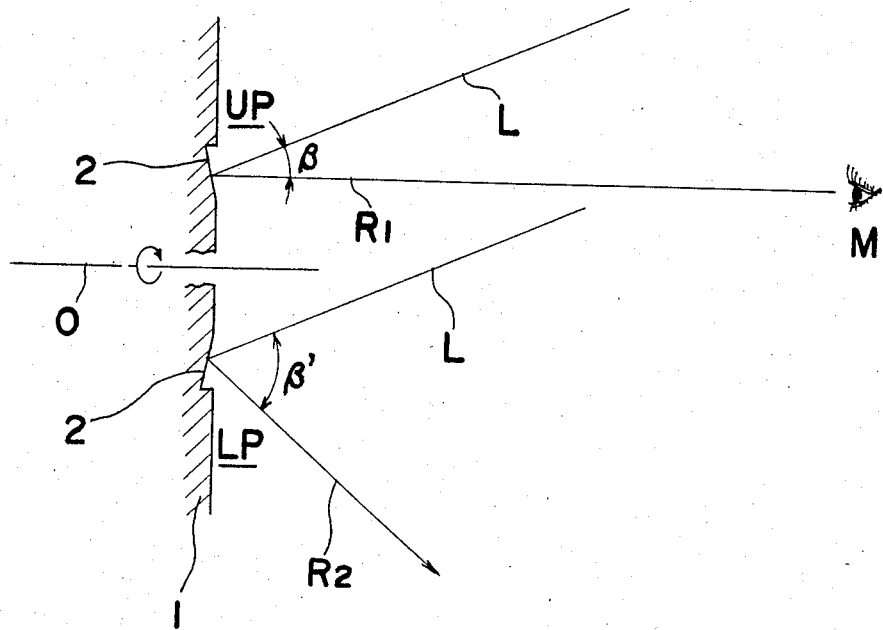
FIG. 2 is a schematic diagram explanatory of the manner in which the incident light is reflected at the reflection faces of the rotary indicating device shown in FIG. 1c.

Referring to FIG. 2, which diagramatically illustrates a manner in which a reflection face 2 takes two rotary positions UP and LP diametrically opposite to each other with respect to the rotary axis O. Assume that the light L from a light source (not shown) is being projected toward the base member 1 and that observer M is located at such a position with respect to the rotary indicating device that the reflective light R1 reflected at a reflection face 2 located at the upper rotary position UP is directed toward the eyes of the observer M, then the angle between the incident light L and the reflected light R1 is indicated by a reference symbol $\beta$. The reflected light reflected at the reflection faces which are positioned at various rotary positions including the lower position LP and other than said upper rotary position UP are not respectively directed toward the eyes of the observer M. For example, the reflected light reflected at the reflection face 2 taking the lower rotary position LP is directed below the eyes of the observer, the angle $\beta'$ between the incident light L and the reflected light R2 assuming an angle larger than the angle $\beta$. Accordingly, the observer taking an appropriate fixed position with respect to the rotary indicating device as described above, may visually recognize the image "T" once per a single rotation of the base member 1, and thus when the base member is rotated at a rotational speed over a predetermined value, the observer may visually recognize the individual images reflected from the indication region taking the upper rotary position UP each rotation thereof, as a single static image "T" due to the after image phenomenon. The after image phenomenon is a visual image which persists after the visual stimulus ceases.

Figure 1D:
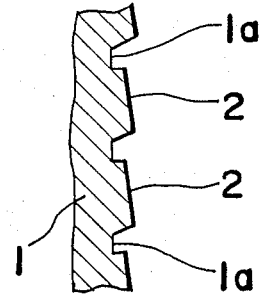
FIGS. 1d, 1e and 1f are, respectively, views similar to FIG. 1c, illustrating modifications of the first embodiment shown in FIG. 1c.
Figure 1E:
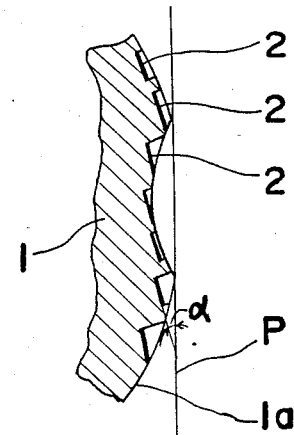
Figure 1F:
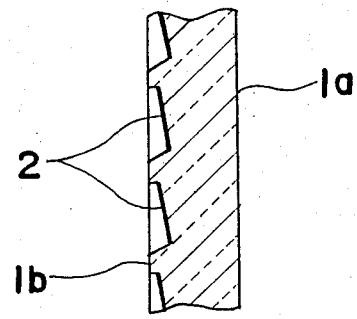

Referring to FIG. 1d, there is provided a modification in which the reflection faces 2 are respectively formed on top faces of projections rising over the front surface 1a. Further, the indication surface 1a may be modified as shown in FIG. 1e in which the indication surface 1a is curved, but each angle α of the reflection faces 2 with respect to the standard plane P is still maintained. Still further, the base member 1 may be made, as shown in FIG. 1f, by a thin transparent plate. The indication surface is composed of a rear surface 1b of the thin transparent plate.

Figure 3A:
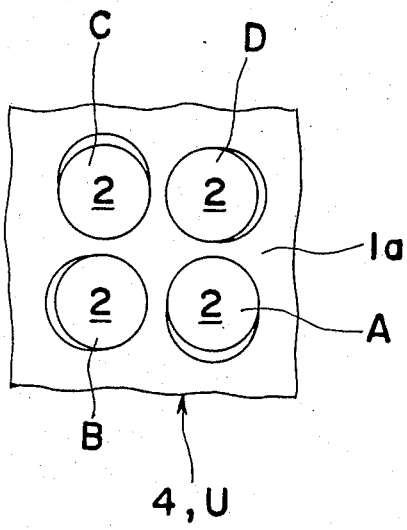
FIG. 3a is an enlarged front elevational view illustrating an essential part, i.e., an image element unit, of the rotary indicating device according to a second embodiment of the present invention.
Figure 3B:
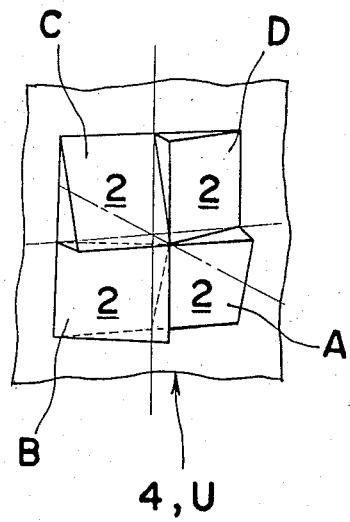

Referring to FIGS. 3a to 3c, 4a to 4d, 5 and 6a to 6d, there is provided a further improved rotary indicating device according to a second embodiment of the present invention, in which the indication region 4 comprises a plurality of same image element units U regularly arranged thereon. Each image element unit U may comprise a various number of reflection faces, but the illustrated embodiment comprises four reflection faces respectively indicated by reference symbols A, B, C and D in FIG. 3a which illustrates only one unit U. The reflection faces 2 shown in FIG. 3a are basically similar in construction to the ones in FIGS. 1b and 1c, that is to say, each reflection face is inclined at the same angle with respect to a standard plane or a front surface 1a. But, in this embodiment, each of the reflection faces A to D is oriented in various directions having a phase difference of 90° from each other. In addition, the reflection faces 2 of each image element U may also be formed by projections having inclined top reflection faces A to D as shown in FIG. 3b.

Figures 4A, 4B, 4C, 4D:
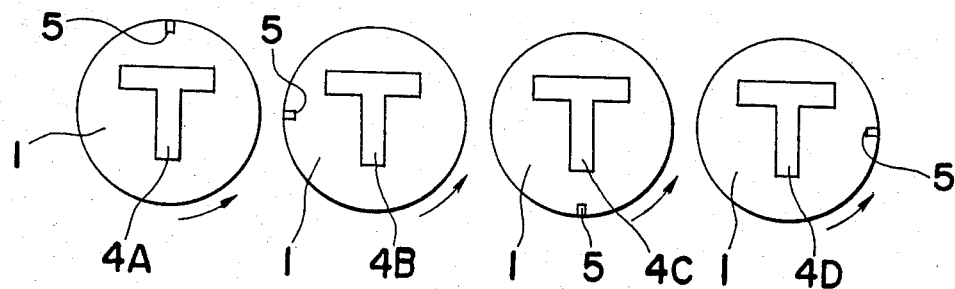
FIGS. 4a, 4b, 4c and 4d are, respectively, front elevational views illustrating the rotary indicating device, at different rotary positions, provided with the image element units shown in FIG. 3c.
Figure 3C:
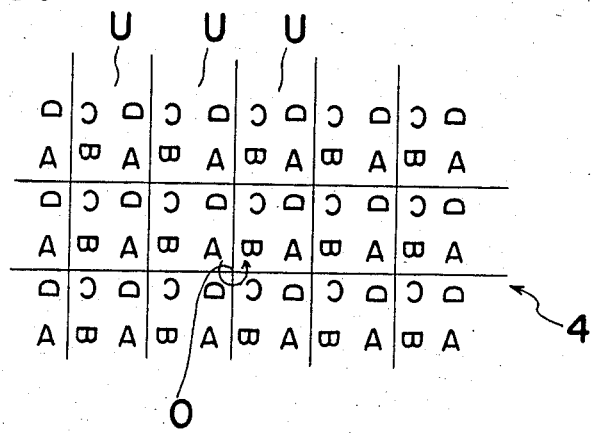
FIG. 3c is a diagram illustrating an essential part of an indication region employing the image element units shown in FIG. 3a or 3b, with the arrangement of the reflection faces indicated by reference symbols per se.

The indication region including the image "T" formed by the arranged image element units as shown in FIGS. 3a or 3b. is partially indicated in FIG. 3c, in which the reference symbols A to D per se substitute for the reflection face 2 and the orientation of the symbols A to D represent the phase angles of the reflection face corresponding to them in FIGS. 3a or 3b. Referring to FIGS. 4a to 4d, assuming now that the light reflected at the reflection faces A are directed toward the observer located at an appropriate fixed position with respect to the rotary indicating device so that the observer can visually recognize the image "T" when the base member 1 takes a first rotary position as shown in FIG. 4a, the rotary positions being indicated by a mark 5 provided on a fixed peripheral portion of the base member 1, and the image "T" will be also recognized by said observer in turn at other rotary positions, as shown in FIGS. 4b, 4c and 4d, in a manner as follows.

Assuming now that the base member 1 is rotated in a direction indicated by an arrow in FIGS. 3c and 4a to 4d, the reflection faces B, C and D of each image element unit U in the indication region 4 will, in turn, reflect the light toward the observer at each rotary angle of 90° so that the images 4B, 4C and 4D respectively formed by the corresponding reflection faces B, C and D to indicate "T" may be visually recognized in turn by the observer. Accordingly, the observer can recognize the image "T" four times per a single rotation of the base member 1, so that an image formed on the eyes of the observer due to the after image phenomenon will be improved in clearness of the image as compared with the first embodiment shown in FIGS. 1a, 1b and 1c.

Referring to FIGS. 5 and 6a to 6d, there is provided a third embodiment in which non-reflection lines arranged in the indication region 4 appear to be moving parallel during the rotation of the base member 1.

Figure 5:
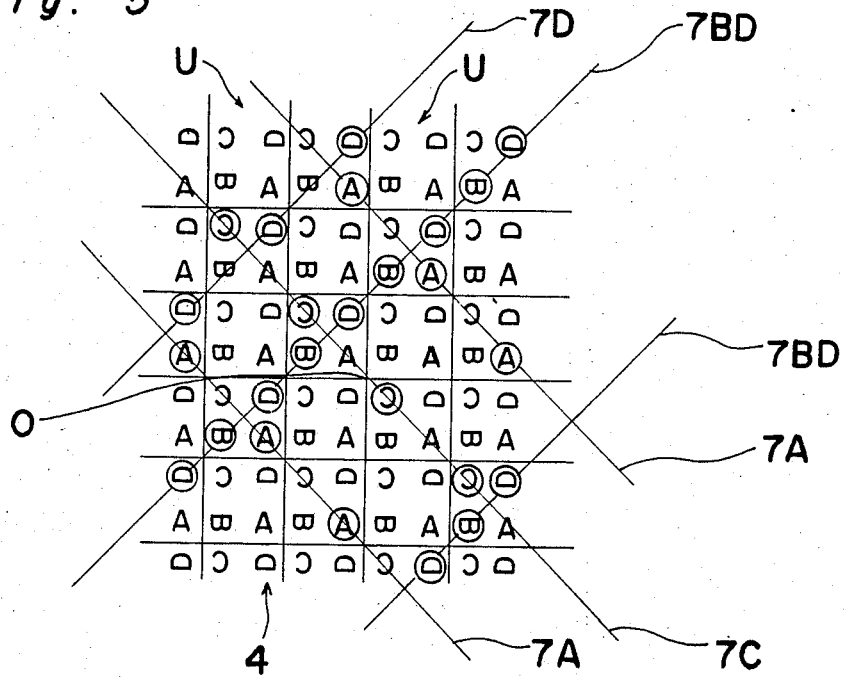
FIG. 5 is a view similar to FIG. 3c illustrating an indication region according to a third embodiment of the present invention.

As shown in FIG. 5, the arrangement of the image element units U in the indication region 4 and the arrangement of the reflection faces 2 in each of the image element units U are respectively, substantially the same as those of FIG. 3c, but in this embodiment, some desired reflection faces in some desired image element units U are treated so as to make no or poor reflection, the non-reflection faces being indicated by the circles enclosing the reference symbols A, B, C and D. The non-reflection faces are aligned on non-reflection lines 7A, 7BD, 7C and 7D substantially arranged in a lattice. The detailed manner or regulation as to the arrangement of the non-reflection faces in the indication region, which may be different to understand from FIG. 5, will become apparent from the following description referring to FIGS. 6a to 6d.

Figure 6A:
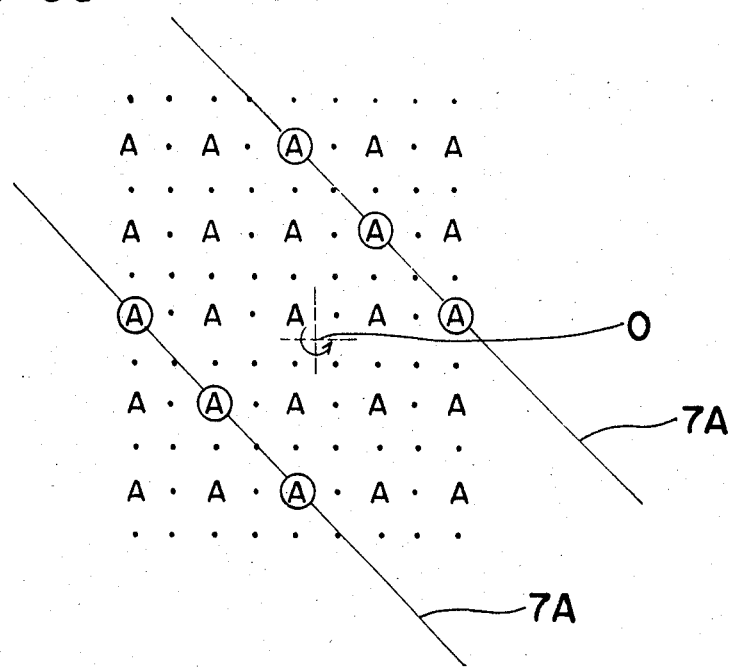
FIGS. 6a, 6b, 6c and 6d are, respectively, views similar to FIG. 5, illustrating a rotary indicating device shown in FIG. 5 at different rotary positions.
Figure 6B:
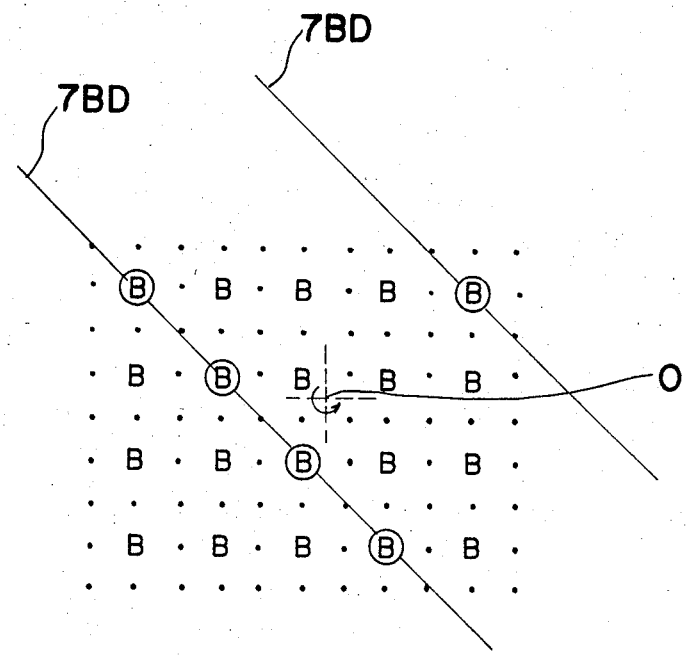
Figure 6C:
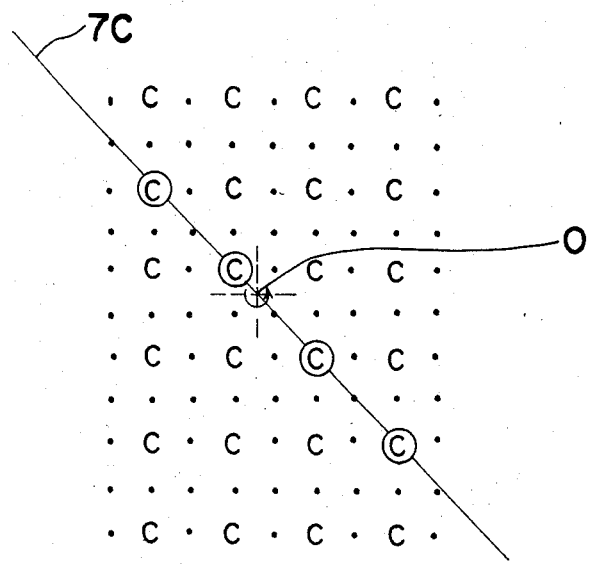
Figure 6D:
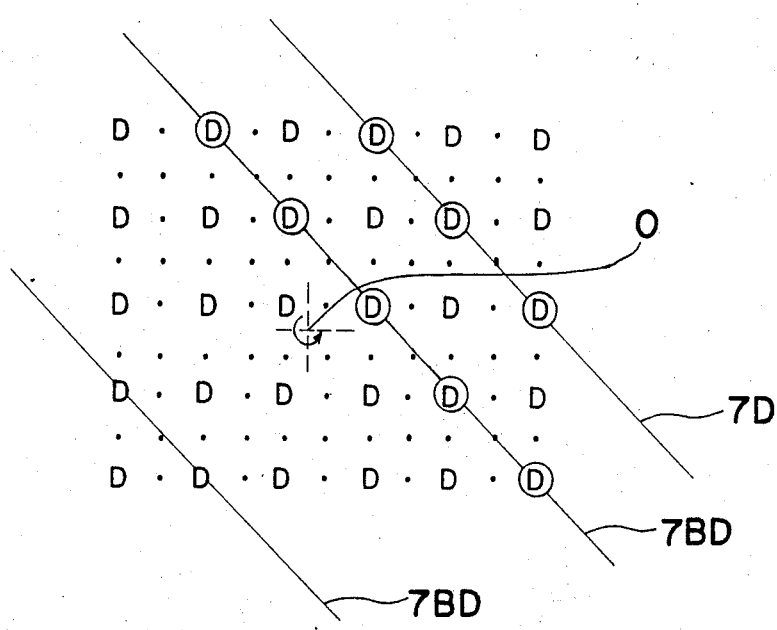

FIGS. 6a to 6d respectively illustrate essential parts of the indication region 4 of the base member 1 taken at different rotary positions having a phase difference of 90° from each other. In addition, in order to simplify the drawings, in FIGS. 6a to 6d, the reflection faces directing reflection lights in directions different from the observer are indicated merely by points. As shown in FIG. 6a, illustrating the initial rotary position of the base member 1, the image visible to the observer are composed of only reflection faces A of each image element unit U, and includes non-reflection lines 7A. And subsequently, in the following rotary positions of the base member 1, as shown in FIGS. 6b, 6c and 6d, the images are alternately composed of the reflection faces B, C and D of each image element unit, but alternately includes non-reflection lines 7BD, 7C or 7D. Therefore, the non-reflection lines appear to be gradually moving parallel in a slanting direction.

Figure 7:
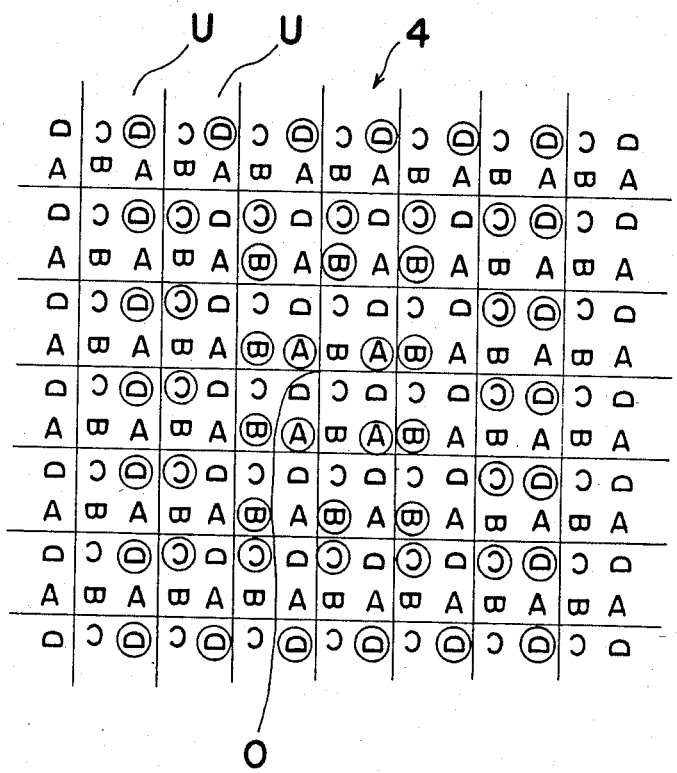
FIG. 7 is a view similar to FIG. 5 illustrating a modification of the third embodiment of the present invention.
Figure 8A:
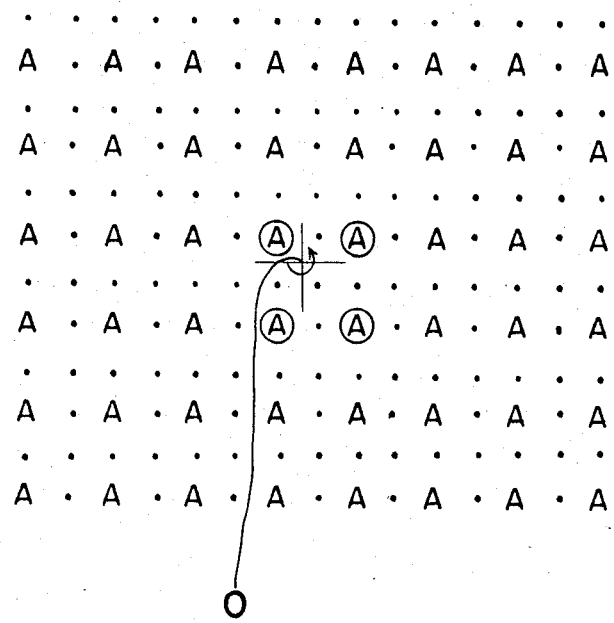
FIGS. 8a, 8b, 8c and 8d are, respectively, views of the rotary indicating device of FIG. 7, similar to FIGS. 6a to 6d.
Figure 8B:
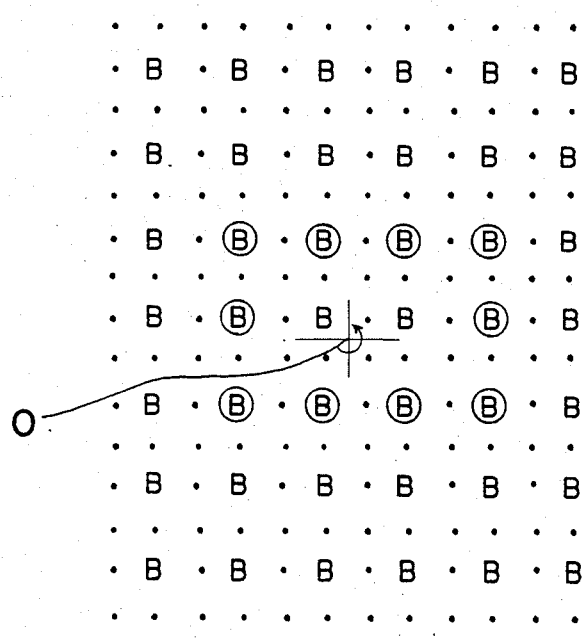
Figure 8C:
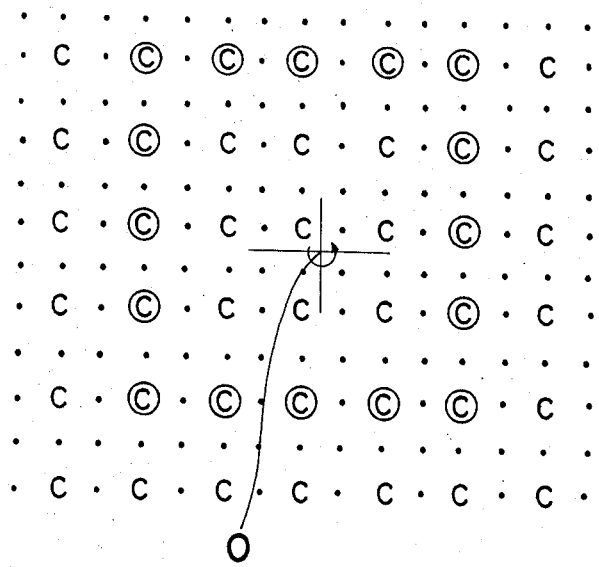
Figure 8D:
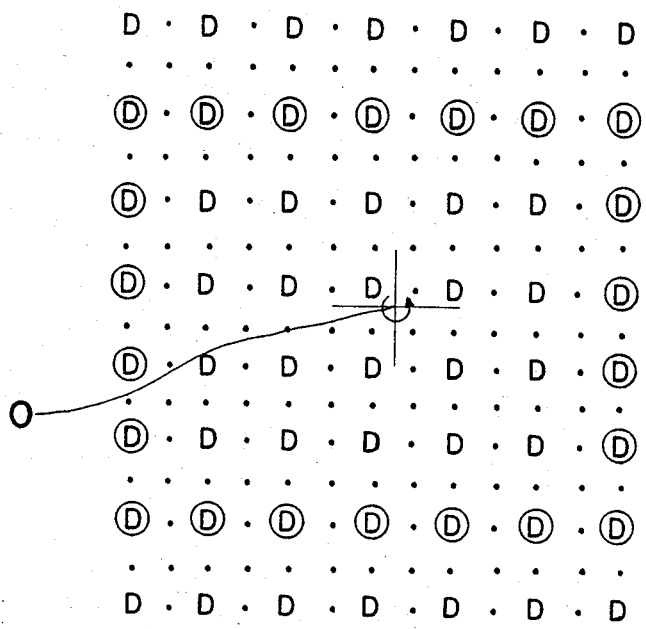

The moving manner of the image visible to the observer can be modified as desired by the variation of the arrangement as to the non-reflection faces or the reflection faces. In FIGS. 7 and 8a to 8d are illustrated such a modification in which a substantially rectangular non-reflection line included in the visual image appears to be moving so as to radially outwardly expand. In the modification, the non-reflection faces A, B, C and D are arranged as shown in FIG. 7. The rotary positions of the base member 1 are illustrated in FIGS. 8a to 8d in the same manner as FIGS. 6a to 6d. The visual images are alternately composed of the reflection faces A, B, C or D of each image element unit U and alternately include non-reflection faces A, B, C or D which respectively, collectively form substantially rectangular lines. It will be readily seen that the rectangular lines composed, in turn, of groups of non-reflection faces A, B, C or D radially outwardly extend according to the rotation of the base member 1.

Figure 9A:
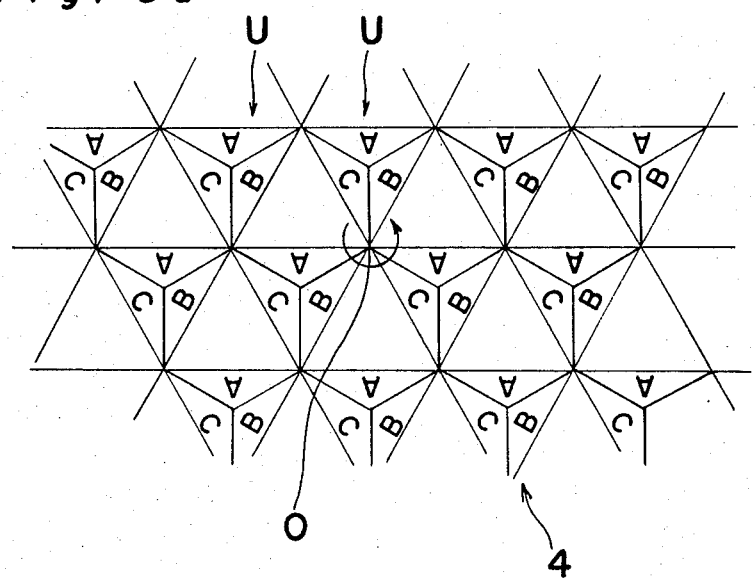
FIGS. 9a and 9b are views similar to FIG. 3c, respectively, illustrating parts of indication regions according to the modifications of the indiction region in FIG. 3c.
Figure 9B:
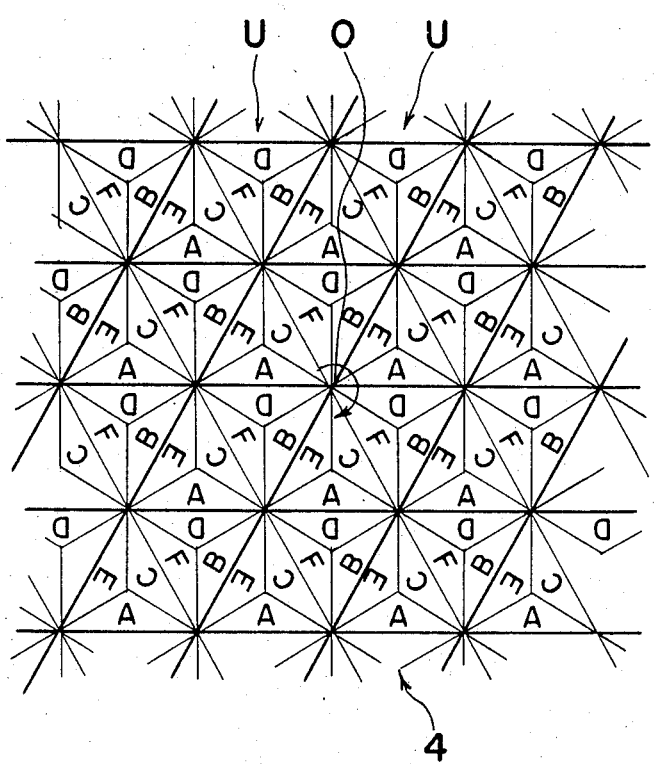

Meanwhile, although in any of the proceeding embodiments as described above, each image element unit is composed of four image elements or four reflection faces, the image element unit may be composed of less or more numbers of reflection faces. For example, each image element unit U included in the indication region 4 is composed, in FIG. 9a on one hand, of three reflection faces A, B and C having a phase difference of 120° from each other so that the observer may visually recognize the image three times per a single rotation of the base member, and, in FIG. 9b on the other hand, is composed of six reflection faces A, B, C, D, E and F having a phase difference of 60° from each other so that the observer may visually recognize the image six times per a single rotation of the base member.

Figure 10B:
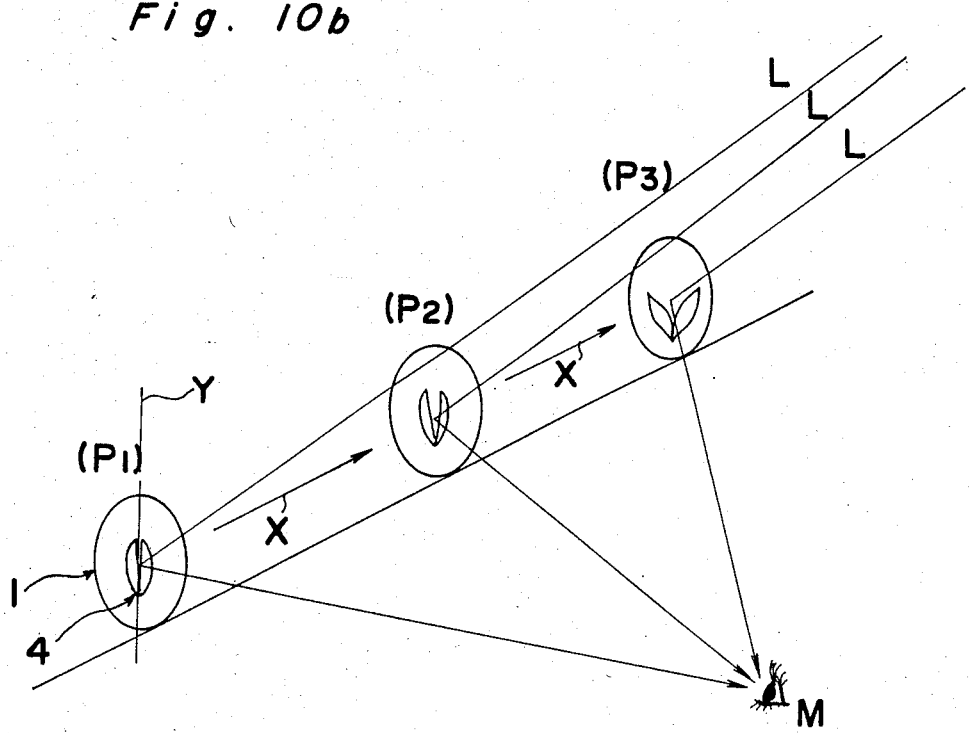
FIG. 10b is a schematic perspective diagram explanatory of the manner in which the image formed on the rotary indicating device shown in FIG. 10a appears to be moving according to the linear advancement of the rotary indicating device.
Figure 10A:
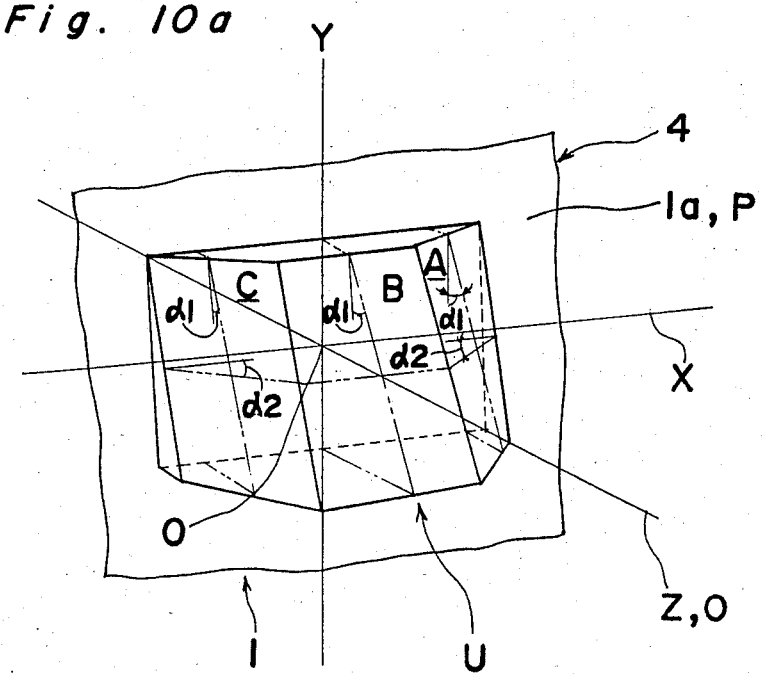
FIG. 10a is a view similar to FIG. 3b illustrating an image element unit according to a fourth embodiment of the present invention.
Figure 10C:
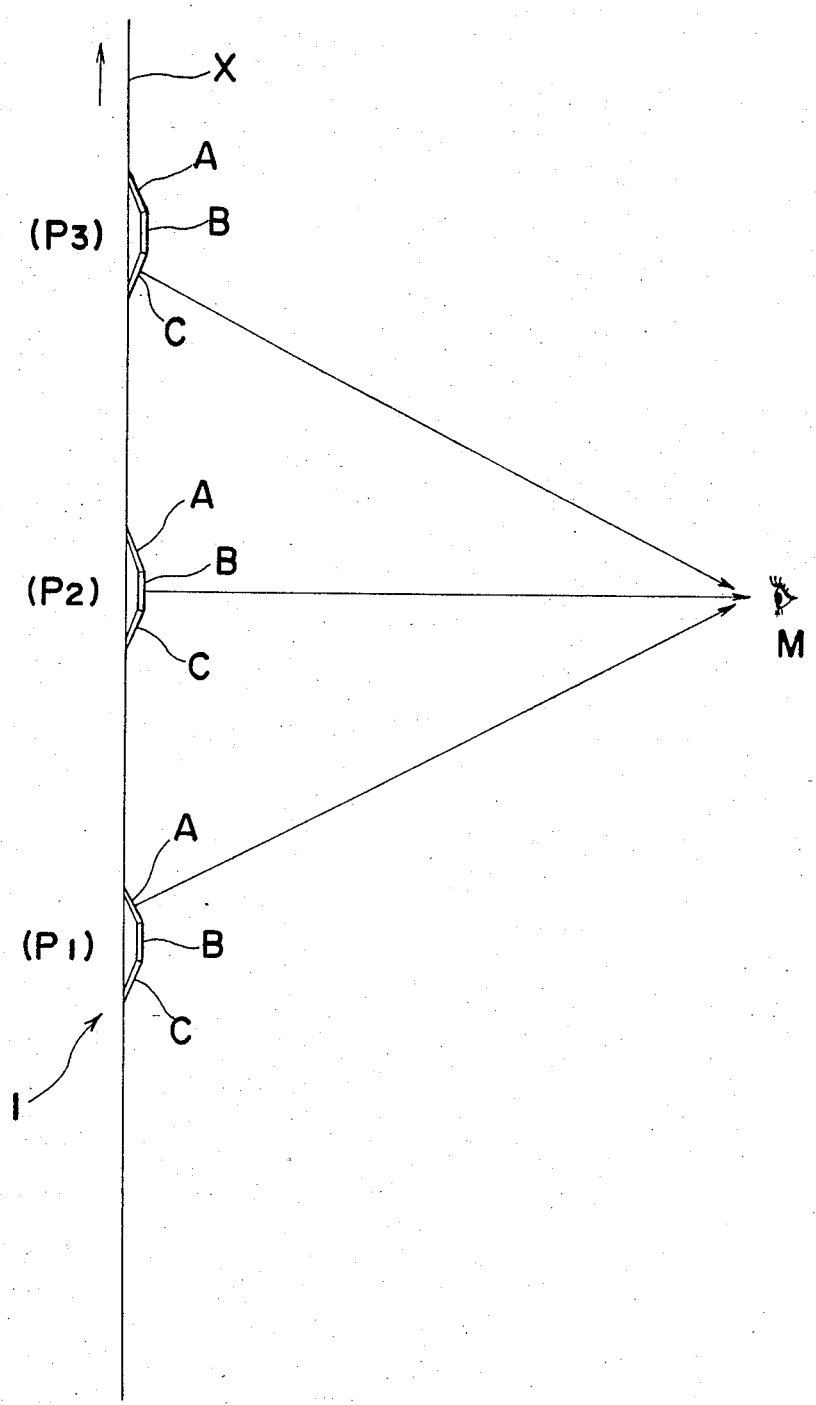
FIG. 10c is a schematic top plan diagram explanatory of the manner in which the reflection faces of each image element unit shown in FIG. 10a alternately reflect the lights toward the observer, depending on the advancing positions of the rotary indicating device.

Finally, referring to FIGS. 10a to 10c, there is provided a fourth embodiment according to the present invention in which the image formed on the rotary base member appears to the observer to be moving as desired when the base member advances in a linear direction with rotation. This embodiment may be preferably adapted to, for example, wheel covers for a motor vehicles as a rotary indicating device.

According to the fourth embodiment, the base member provided for the rotary indicating device has an indication region 4 indicating an image, i.e., a flower in this embodiment, the indicating region 4 being composed of a plurality of image element units U in substantially the same manner as the former embodiments, but in this embodiment, each image element unit U basically comprises three reflection faces A, B and C as illustrated in FIG. 10a. The reflection faces A, B and C are respectively formed on the peripheral surface of a projection protruding forwardly from the front surface 1a, i.e, the standard plane of the base member 1. In FIG. 10a are illustrated space coordinate axes X, Y and Z, the axis Z corresponding to the rotary axis O. Each of the reflection face A, B and C are respectively inclined at an appropriate angle $\alpha 1$ with respect to a plane containing two coordinate axes X and Y, viewed in a Y-axial direction. The side reflection faces A and B are additionally oppositely inclined at an appropriate angle $\alpha 2$ with respect to said plane, viewed in X-axial direction.

Referring to FIGS. 10b and 10c, assume that the rotary indicating device advances, with rotation, in a linear direction indicated by an arrow along the axis X with respect to an observer M located at a fixed position, and that incident light comes at an appropriate angle with respect to the base member 1. The observer M will then alternately recognize reflection lights from different reflection faces A, B and C of each image element unit U according to advancing positions of the rotary indicating device. Namely, when the rotary indicating device passes through an appropriate approaching point P1, the reflected lights from only the reflection faces A are directed toward the observer M. Subsequently, when the rotary indicating device advances to a point P2 ahead of the observer M, the reflected lights from only the reflection face B are directed toward the observer, and finally, when the rotary indicating device passes through an appropriate leaving point P3, the reflection lights from only the reflection faces C are directed toward the observer M. Accordingly, the observer M visually recognizes, in turn, the images alternately formed by the reflection faces A, B and C depending on the advancing points P1, P2 and P3 of the rotary indicating device. Therefore, in order to change the visual image to the observer depending on the advancing points of the rotary indicating device, in this embodiment, the number of the reflection faces of each image element unit U are differed from each other as desired. That is to say, the reflection faces of the image element units U are partially treated so as to produce no or poor reflection so that reflected light from the reflection faces A indicate a first image, i.e., a closed flower in the illustrated embodiment. Also, the reflection faces B and C of the image element units U respectively, partially treated so as to produce no or poor reflection so that the reflected light from the reflection faces B and C indicates second and third images, i.e., a slightly opened flower and completely opened flower in said embodiment. Thus, the flower formed on the base member appears to the observer to be gradually opening according to the advancement of the rotary indicating device.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A rotary indicating device which comprises a base member adapted to be rotated about a rotary axis and having an indication surface, said indication surface including an indication region formed thereon and representing a desired image, said indication region comprising a plurality of image element units each of which includes a predetermined number of image elements each consisting of a corresponding reflection face, said reflection face of each image element unit being inclined in various directions at a same angle with respect to a standard plane perpendicular to a rotary axis of said base member so that when said base member rotates, said reflection faces of each image element unit alternately reflect light coming at an angle with respect to said rotary axis, into a fixed direction at a fixed rotary position of said base member.

2. A rotary indicating device which comprises a base member adapted to be rotated about a rotary axis and having an indication surface said indication surface including an indication region formed thereon and representing a desired image, said indication region comprising a plurality of image element units which respectively include a desired number of image elements each consisting of corresponding reflection faces, said reflection faces of each image element unit being inclined in various directions at a same angle with respect to standard plane perpendicular to a rotary axis of said base member so that when said base member rotates, said reflection faces of each image element unit alternately reflect light coming at an angle with respect to said rotary axis, into a fixed direction at a fixed rotary position of said base member, whereby, when the rotary indicating device rotates at a rotational speed over a predetermined value, the visual image reflected from said indication surface toward an observer appears to be moving depending on the variation of the number of reflection faces reflecting light toward the observer at a fixed rotary position of said base member.

3. A rotary indicating device which comprises a base member adapted to be rotated about a rotary axis and having an indication surface said indication surface including an indication region formed thereon and representing a desired image, said indication region comprising a plurality of image element units which respectively include a desired number of image elements each consisting of a corresponding reflection face, the reflection faces of each image element unit being inclined at such angles with respect to a standard plane perpendicular to a rotary axis of said base member that when said base member advances relatively with respect to an observer in a linear direction along a plane including said standard plane with rotation at a rotational speed over a predetermined value, the reflection faces of each image element unit for reflecting light toward the observer may change in turn, whereby when the rotary indicating device advances with rotation, the visual image reflected from said indication surface appears to the observer to be moving depending on the advancement of said base member.

4. A rotary indicating device which comprises a base member adapted to be rotated about a rotary axis and having an indication surface said indication surface including an indication region formed thereon and representing a desired image, said indication region comprising a plurality of image element units, each image element unit defining a predetermined number of reflection faces inclined in various directions with respect to a standard plane perpendicular to the rotary axis of said base member and with corresponding reflection faces of each image element unit inclined at the same angle so that when said base member rotates said reflection faces of each image element unit alternately reflect light coming at an angle with respect to said rotary axis, into a fixed direction at a fixed rotary position of said base member, whereby when the rotary indicating device rotates at a speed over a predetermined value, an observer located at a fixed position with respect to the device can continuously receive the reflection lights from the reflection faces of the base member a plurality of time during each revolution of the base member, to see the desired image as a static image due to the after image phenomenon.

* * * * *